United States Patent [19]
Hamilton et al.

[11] 3,711,401
[45] Jan. 16, 1973

[54] REGENERATION METHOD FOR DUAL BEDS OF ION EXCHANGE RESINS

[75] Inventors: Robert S. Hamilton, Princeton Junction; Albert W. Kingsbury, Moorestown; John R. Anderson, Cranbury, all of N.J. 08512

[73] Assignee: Sybron Corporation, Rochester, N.Y.

[22] Filed: March 8, 1971

[21] Appl. No.: 121,798

[52] U.S. Cl. ..................210/34, 210/37, 210/38
[51] Int. Cl. .............................................B01d 15/06
[58] Field of Search..........210/24, 30, 32, 34, 35, 37, 210/38

[56] References Cited

UNITED STATES PATENTS 3,505,247    4/1970    Hetherington et al..............210/31 X

OTHER PUBLICATIONS

Adams; "Progressive Mode, A New Approach to Ion Exchange," Permutit Technical Bulletin, Vol. VIII, No. 1, Code 6131, April 1970.
Rohm & Haas Bulletin Le–107–67, Amberlite, IRA–93, Amberlite IRS–402, Stratified Beds of Anion Exchange Resins, February 1967.
Wirth; "The Trouble With Layered Beds", Preprint of Paper Presented before 29th International Water Conference, Pittsburgh, Pa., Novemeber 1968.

Primary Examiner—Samih N. Zaharna
Attorney—Theodore B. Roessel

[57] ABSTRACT

Ion exchange columns containing a layer of weak resin and a layer of strong resin are regenerated by passing partially spent regenerant through the column to regenerate the weak resin and then passing fresh regenerant through the column to regenerate the strong resin. Efficient regeneration is achieved in a downflow regeneration process and silica and calcium sulphate precipitation problems are reduced. In some cases, it is desirable to soak the strong resin in regenerant after the weak regenerant as been passed through the column in order to improve separation of the resins, shorten the total regeneration time and remove additional silica ions. The processes are preferably practiced on systems of three or more columns in which the columns are sequentially exhausted and regenerated, with at least two columns being regenerated in series.

6 Claims, 3 Drawing Figures

REGENERATION METHOD FOR DUAL BEDS OF ION EXCHANGE RESINS

BACKGROUND OF THE INVENTION

This invention relates to a method of operating and regenerating layered bed ion exchangers and more specifically to a method of sequentially regenerating a plurality of layered bed ion exchangers.

Ion exchangers with one layer of a weakly basic or weakly acid resin and a second layer of strongly basic or strongly acidic resin are used in order to obtain the benefit of features of the individual resins that complement each other. One reason for using layered units is to take advantage of the fact that weak resins can be effectively regenerated with partially spent, or impure regenerant, which would not be suitable for the regeneration of strong resins.

Strong resins can not be effectively regenerated with impure regenerants because of the unfavorable equilibrium conditions that would exist. As a result, relatively pure regenerant must be used to regenerate strong resins, and the regenerant effluent from a strong layer of resin always contains a substantial quantity of exchangeable regenerant ions. This partially spent effluent can be used to regenerate weak resins. Thus, it is frequently possible to regenerate both layers with the same amount of regenerant that would be required to regenerate the strong resin alone. Unfortunately, this type of regeneration leads to certain problems that have kept layered beds from being widely adopted.

The first problem arises from the physical arrangement of the resins in layered beds. Presently available weak resins are less dense in the regenerated form than their strong counterparts. As a result, in layered beds the weak resin is placed on top so that the density differential can be used to separate the resins. Consequently, for all practical purposes, if the regenerant is to pass through the strong resin and then through the weak resin, it must flow up through the bed. Upflow regeneration is possible, but it tends to fluidize the resin beds. This leads to channeling in the bed, which can be avoided only by the use of additional equipment or complicated techniques that offset the economies derived from more efficient regeneration.

In addition to the physical problems presented by upflow regeneration, in certain cases chemical problems arise when the partially spent regenerant from a layer of strong resin is passed through a layer of weak resin. For example, precipitation problems may occur when caustic soda is used to regenerate layered anion exchange bed which are partially in the silica form or when sulphuric acid is used to regenerate layered cation exchange beds which are partially in the calcium form.

When layered anion exchange beds are used to absorb silica ions, most of the silica ions are absorbed by the strongly basic resins. If these resins are regenerated with caustic soda and the regenerant effluent is passed through a layer of weakly basic resin, the silica will tend to precipitate due to the lowered pH conditions existing in the weakly basic resin. Others have proposed to prevent this by discarding the first quarter or third of the regenerant effluent from the strongly basic layer, but this reduces the regeneration efficiency of the process.

A similar problem may occur when sulphuric acid is used to regenerate a layered bed of cation exchange resins which are partially in the calcium form. In this type of unit, the calcium ion is usually concentrated in the weakly acidic layer. If sulphuric acid is used to regenerate the bed, the acid concentration must be kept below the optimum levels for regeneration of the strongly acidic resin in order to keep the sulphate ion concentration low enough to prevent the precipitation of calcium sulphate in the weakly acidic resin. When the weak and strong resins are in separate columns, this is usually accomplished by diluting the regenerant between the strong and the weak beds. While it is possible to dilute the regenerant at the interface between layers in a single column, this type of operation is difficult. As a result, in most cases where weakly acidic and strongly acidic resins are used to treat fluids containing calcium ions, the resins are segregated in separate columns.

An additional problem with layered bed columns is that the resins become mixed in use. When the resins are new, the density differences are usually great enough so that they can be separated by backwashing, however, after the resins have been in use for a period of time, the density difference may decrease to the point where backwashing, by itself, is not enough to separate the resins effectively. Hetherington et al, in U.S. Pat. No. 3,505,247, have proposed to combat this problem by a two step regeneration process in which the first regenerant is one that preferentially regenerates the weak resin. However, their process necessitates the use of two different regenerants, which increases the complexity and the cost of the process.

OBJECTS OF THE INVENTION

It is an object of this invention to provide an efficient method for operating and regenerating layered bed ion exchangers that avoids the problems of upflow regeneration.

Another object of this invention is to provide a process for regenerating layered anion exchange beds that are at least partially in the silica form in a manner which reduces silica precipitation.

A still further object is to provide a process for regenerating layered cation exchange beds that are at least partially in the calcium form with sulphuric acid without precipitation of calcium sulphate.

Yet another object of this invention is to provide a method for regenerating layered bed ion exchangers whereby more effective separation of the resin is achieved.

Other objects and advantages of this invention will be apparent from the following description.

SUMMARY OF THE INVENTION

In the processes of this invention, the foregoing objects are achieved by adapting the sequential regeneration technique disclosed by R. C. Adams and J.R. Anderson in U.S. patent application Ser. No. 842,449, filed July 17, 1969 now U.S. Pat. No. 3,632,506, to the requirements of layered bed regeneration. These processes are designed for systems containing at least three columns, which are exhausted one after the other and regenerated in the order in which they are exhausted. However, the processes of this invention can be used with systems containing less than three columns if an interruption in service during regeneration can be tolerated.

The columns are regenerated by passing regenerant through a plurality of columns connected in series so that the regenerant passes through a layer of weak resin and then through a layer of strong resin in each column. Since the weak resin forms the upper layer in each column, the regenerant flows down through each column. Thus, the problems of upflow regeneration are avoided.

When the first column in the regeneration series is regenerated, the regenerant introduction point is moved from the first column to the next column in the regeneration series and an exhausted column is added to the end of the series. Thus, each column is gradually exposed to an increasing concentration of regenerant ions.

At least part of the partially spent regenerant effluent from the first column is passed through the latter columns in the series. Preferably, in order to obtain maximum use from the regenerant, the regenerant concentration and flow rate in the first column are adjusted so that substantially all of the effluent from the first column can be used in the latter columns in the series.

The quantity of partially spent regenerant passed through the latter columns in the regeneration series is controlled so that substantially all of the exchangeable regenerant ions are exchanged before the regenerant reaches the last layer in the series, which is a layer of strong resin. This layer is not regenerated in this step, however, salts in the spent regenerant do elute some ions, e.g. silica, from this layer. This reduces silica precipitation during later stages of regeneration.

It may be desirable to soak the lower layers, which contain the strong resin, in regenerant between steps of the regeneration process. In this manner, better separation of the resin may be achieved, subsequent regeneration steps may be shortened and in the case of anion exchange resins, additional silica may be removed.

In certain cases, particularly the sulphuric acid regeneration of layered cation exchange beds containing calcium, the partially spent regenerant is diluted between columns in order to avoid precipitation in the latter columns of the series.

DETAILED DESCRIPTION OF THE INVENTION

Figure 1:
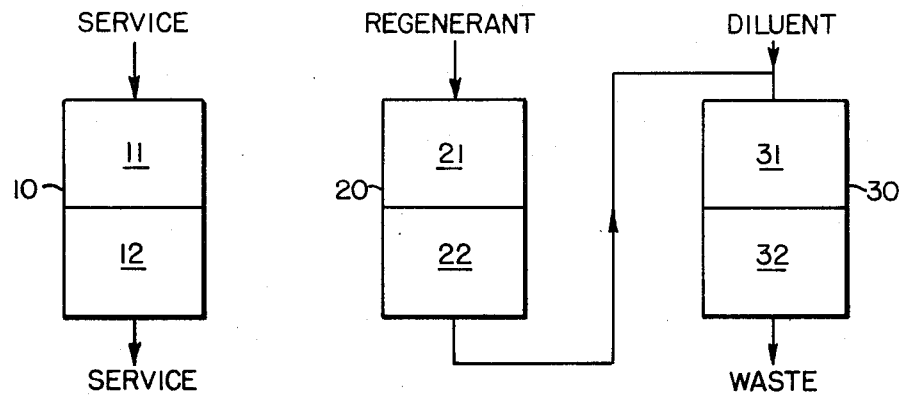
FIGS. 1 – 3 are schematic flow diagrams of the principal steps in certain embodiments of this invention.
Figure 2:
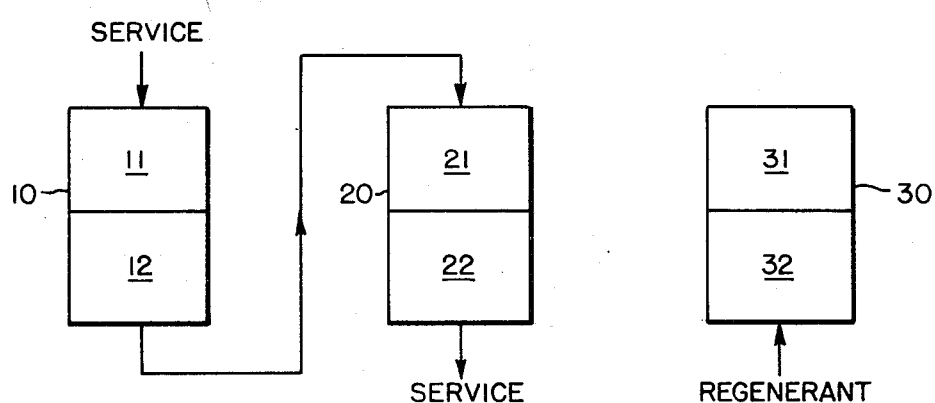
Figure 3:
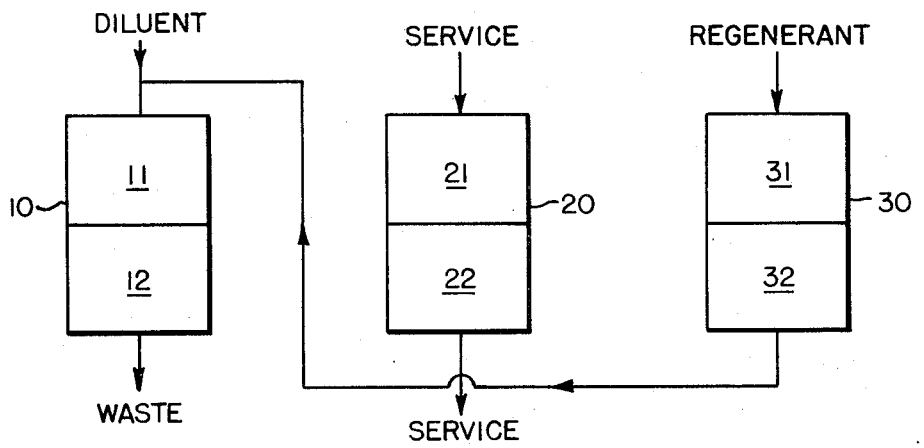

FIGS. 1 – 3 illustrate a layered bed ion exchange system containing three columns 10, 20 and 30. Each column contains an upper layer 11, 21 and 31 of weak, i.e. weakly basic or weakly acidic, resin and a lower layer 12, 22 and 32 of strong, i.e. strongly basic or strongly acidic, resin. If layers 11, 21 and 31 are basic, so are layers 12, 22 and 32. Similarly, if layers 11, 21 and 31 are acidic, layers 12, 22 and 32 are acidic.

In the step shown in FIG. 1, column 10 is in service. The fluid being treated is passed down through layer 11 and then through layer 12. At the same time columns 20 and 30 are being regenerated in series. Regenerant is introduced at the top of column 20 and flows down through layer 21 and layer 22. At least part of the partially spent regenerant effluent from column 20 is passed down through column 30, passing first through layer 31 and then through layer 32.

Prior to the step shown in FIG. 1, the weak resin in upper layer 21 of column 20 has been substantially completely regenerated. Thus, the regenerant that reaches layer 22 is relatively pure and favorable conditions are established in layer 22 for the regeneration of the strong resin therein.

At least part of the partially spent regenerant effluent from column 20 is passed down through column 30, wherein it regenerates the weak resin in upper layer 31. Preferably, the quantity of partially spent regenerant passed down through column 30 is substantially equal to the amount required to regenerate the upper layer 31 of weak resin. Since the weak resin can be effectively regenerated with the partially spent regenerant, substantially all of the exchangeable regenerant ions are utilized in the weak layer. Few, if any, of these ions pass on into layer 32, where they could not be utilized efficiently because of the unfavorable equilibrium conditions that are created when a strong resin is contacted with partially spent regenerant.

Preferably, the concentration of the regenerant introduced at the top of column 20 and the flow rate of the regenerant through this column are regulated so that the partially spent regenerant effluent from column 20 contains substantially the quantity of exchangeable regenerant ions needed to regenerate the weak resin in layer 31. In this manner, the most efficient utilization of the regenerant is achieved.

Since substantially all of the exchangeable regenerant ions are used up by the time the regenerant leaves layer 31, the lower layer 32 of strong resin in column 30 is not regenerated in the step shown in FIG. 1. However, in some cases, certain ions that have been taken up by the strong resin may be exchanged for other ions in the spent regenerant. This phenomenon is particularly useful in the regeneration of layered anion exchange beds that are partially in the silica form.

When layered anion exchange beds are used to treat fluids, such as water, which contain silica, most of the silica is taken up by the strong resin. Other anions, such as sulphate and chloride ions, are taken up by the weak resin. When a regenerant such as sodium hydroxide passes through the weak resin in layer 31, the sodium hydroxide is converted to salts such as sodium sulphate and sodium chloride. As the spent regenerant passes through the strong resin in layer 32, some of the silica ions that have been taken up are exchanged for the sulphate and chloride ions in the spent regenerant. This silica is discarded along with the spent regenerant, thus it never has a chance to precipitate in a layer of weak resin.

In certain cases, it may be desirable to dilute the partially spent regenerant effluent from column 20 before it is introduced into column 30. For example, when layered cation exchange beds are used to remove calcium from water, most of the calcium is usually taken up by the weak resin. When this weak resin is regenerated with sulphuric acid, the sulphate ion concentration should be kept below 1 percent to prevent precipitation of calcium sulphate. The sulphate ion concentration in the partially spent regenerant effluent from column 20 will typically be 1 to 5 percent. Thus, the effluent should be diluted as shown in FIG. 1 before it is passed through column 30 so that calcium sulphate will not precipitate in layer 31.

After column 20 has been regenerated, the column is rinsed to remove any remaining regenerant. Typically, the rinse effluent from column 20 is passed through column 30 to use up any exchangeable regenerant ions in the rinse effluent.

Next, column 20 is backwashed to remove any suspended matter filtered from the fluid being treated and other fines and to help separate the weak and strong resins into distinct layers. Backwashing is carried out at this point because the density differences between strong and weak resins are greater when the resins are in the regenerated form.

The next step in the operation and regeneration of this system is illustrated in FIG. 2. In this step the fluid being treated passes through column 20 after it passes through column 10. Thus, column 20 serves as a polisher that removes any ions that leak through column 10. As a result, the ion exchange capacity of column 10 can be substantially completely utilized.

While columns 10 and 20 are being operated in series, it may be desirable to introduce regenerant into the lower layer 32 of column 30 in order to allow layer 32 to soak in regenerant. This increases the contact time between the strongly basic resin and the regenerant, which results in more effective regeneration, particularly with respect to silica removal. In addition, in some cases the net regeneration time for the column can be decreased, because the lower layer 32 of column 30 can be partially regenerated while column 10 is being exhausted. This is of particular importance where two service columns are operated in series with the second column acting as a scavenger for the first. In order to prevent oversizing of the columns, the regeneration time, which is also outage time, must be kept to a minimum.

The soaking step also helps separate the resins. This is important because backwashing in the exhausted form is not always effective from the point of view of resin separation, particularly after the resins have been in use for some time. With certain regenerants, such as caustic soda, the resins will separate more effectively during this step because of the greater density of the caustic soda as compared to the water usually used for backwashing.

Separation is particularly effective at this point because the weak resin is regenerated but the strong resin is not. Since most resins are less dense in their regenerated form, for most combinations of weak and strong resin, the greatest density difference will occur at this point. For this reason, it may be desirable to backwash the column at this point instead of after both layers have been regenerated.

The soaking regenerant may be introduced either at the top or the bottom of the column, however, we prefer to introduce this regenerant at the bottom of the column in the manner shown in FIG. 2, and introduce just enough regenerant to fill the voids in layer 32 and the voids in the zone where the resins from the two layers have mixed. The most efficient use of the regenerant is achieved in this manner. The rate at which regenerant is introduced is kept low enough to avoid flotation of the resin, since this may cause some loss of resin from the top of the column.

When column 10 is exhausted, the fluid being treated is diverted so that it passes through column 20 only, as is shown in FIG. 3. Fresh regenerant is then passed down through column 30, so that it passes through layer 31 and then through layer 32. The weak resin in layer 31 is already substantially completely regenerated. Thus, the regenerant is still relatively pure when it reaches layer 32 and favorable equilibrium conditions are established for the regeneration of the strong resin in this layer.

Another benefit is derived from the previous regeneration of layer 31 if the system is a cation exchanger, the fluid being treated contains calcium and the regenerant is sulphuric acid. Since layer 31 has previously been substantially completely regenerated, relatively concentrated sulphuric acid can be passed down through the column at this point without causing calcium sulphate precipitation in layer 31. Typically, a 1 to 5 percent sulphuric acid solution is used in this step to regenerate layer 32.

At least part of the partially spent effluent from column 30 is passed down through column 10, wherein it regenerates layer 11, which contains weak resin. Thus, column 10 is at the same stage of this regeneration series that column 30 was at in the step illustrated in FIG. 1. Thus, the columns are sequentially regenerated in the same order that they are exhausted.

We claim:

1. A method of regenerating an ion exchange system including at least three columns, each of said columns consisting of a layer of weakly basic anion exchange resin above a layer of strongly basic anion exchange resin, comprising:

a. passing a quantity of partially spent regenerant substantially equal to the amount required to regenerate the layer of weakly basic resin in a first column down through the weakly basic resin and then through a layer of strongly basic resin in said first column, whereby the weakly basic resin is substantially completely regenerated and the strongly basic resin remains at least partially exhausted; and then b. passing fresh regenerant down through the first column and passing the partially spent regenerant effluent from the first column down through a second column having an upper layer of weakly basic resin and a lower layer of strongly basic resin, both of which are at least partially exhausted, until the lower layer of the first column and the upper layer of the second column have been substantially completely regenerated; and then c. passing fresh regenerant down through the second column and passing the partially spent regenerant effluent form the second column down through a third column having an upper layer of weakly basic resin and a lower layer of strongly basic resin, both of which are at least partially exhausted, until the lower layer of the second column and the upper layer of the third column have been substantially completely regenerated.

2. A method according to claim 1 wherein the strongly basic resin in each column is at least partially in the silica form before regeneration, the partially spent regenerant effluent from the first column is discarded after it has been passed through the second column, and the partially spent regenerant effluent from the second column is discarded after it has been passed through the third column.

3. A method according to claim 1 wherein the lower layer of each column is contacted with regenerant after the partially spent regenerant is passed down through the column but before the fresh regenerant is passed down through the column.

4. A method of regenerating an ion exchange system including at least three columns, each of said columns consisting of a layer of weakly acidic cation exchange resin above a layer of strongly acidic cation exchange resin, comprising:

a. passing a quantity of partially spent regenerant substantially equal to the amount required to regenerate the layer of weakly acidic resin in a first column down through the weakly acidic resin and through a layer of strongly acidic resin in said first column, whereby the weakly acidic resin is substantially completely regenerated and the strongly acidic resin remains at least partially exhausted; and then b. passing fresh regenerant down through the first column and passing the partially spent regenerant effluent from the first column down through a second column having an upper layer of weakly acidic resin and a lower layer of strongly acidic resin, both of which are at least partially exhausted, until the lower layer of the first column and the upper layer of the second column have been substantially completely regenerated; and then c. passing fresh regenerant down through the second column and passing the partially spent regenerant effluent from the second column down through a third column having an upper layer of weakly acidic resin and a lower layer of strongly acidic resin, both of which are at least partially exhausted, until the lower layer of the second column and the upper layer of the third column have been substantially completely regenerated.

5. A method according to claim 4 wherein the weakly acidic resin in each column is at least partially in the calcium form prior to regeneration, the partially spent regenerant effluent from the first column is diluted before it is passed through the second column, and the partially spent regenerant effluent from the second column is diluted before it is passed through the third column.

6. A method according to claim 4 wherein the lower layer of each column is contacted with regenerant after the partially spent regenerant is passed down through the column but before the fresh regenerant is passed down through the column.

* * * * *